(12) United States Patent
Demain et al.

(10) Patent No.: US 7,077,473 B2
(45) Date of Patent: Jul. 18, 2006

(54) ATTACHING COVERS TO SEAT CUSHIONS

(75) Inventors: John Demain, Olney (GB); Peter Leach, Hooksett, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 10/406,413

(22) Filed: Apr. 3, 2003

(65) Prior Publication Data

US 2004/0195877 A1 Oct. 7, 2004

(51) Int. Cl.
*A47C 31/00* (2006.01)

(52) U.S. Cl. .............................. 297/228.13; 297/218.2; 297/DIG. 6

(58) Field of Classification Search ............ 297/218.2, 297/218.1, 219.1, 228.13, 452.58, DIG. 6, 297/452.61
See application file for complete search history.

(56) References Cited

U.S. PATENT DOCUMENTS

| | | | |
|---|---|---|---|
| 4,792,111 A | 12/1988 | Taguchi | |
| 4,832,400 A * | 5/1989 | Aoki et al. | 297/284.4 |
| 4,931,344 A | 6/1990 | Ogawa et al. | |
| 5,005,242 A | 4/1991 | Kennedy et al. | 5/481 |
| 5,236,243 A * | 8/1993 | Reyes | 297/219.1 |
| 5,826,939 A | 10/1998 | Beyer | |
| 5,972,465 A | 10/1999 | Ohno et al. | |
| 6,206,467 B1 * | 3/2001 | Mense et al. | 297/218.2 |
| 6,463,635 B1 | 10/2002 | Murasaki | 24/452 |
| 6,561,581 B1 * | 5/2003 | Michot et al. | 297/218.2 |

FOREIGN PATENT DOCUMENTS

| | | |
|---|---|---|
| DE | 1996 1189 | 6/2001 |
| DE | 10121065 | 1/2002 |
| EP | 0 138 724 | 4/1985 |
| FR | 2412736 | 7/1979 |
| FR | 2761863 | 10/1998 |
| FR | 2781733 | 2/2000 |
| FR | 2816185 | 5/2002 |
| FR | 2838927 | 10/2003 |
| JP | 61176390 | * 8/1986 |
| JP | 2788564 | 8/1993 |
| JP | 11276735 | 10/1999 |
| JP | 2001 017279 | 1/2001 |
| JP | 2002 331534 | 11/2002 |
| JP | 2002 337166 | 11/2002 |
| JP | 2003 053067 | 2/2003 |
| WO | WO00/07792 | 2/2000 |
| WO | WO00/18556 | 4/2000 |
| WO | WO01/12022 A1 | 2/2001 |
| WO | WO01/37710 A1 | 5/2001 |

OTHER PUBLICATIONS

International Search Report for PT/US2004/0101497.
International Preliminary Examination Report for PCT/US2004/010497.

* cited by examiner

*Primary Examiner*—Milton Nelson, Jr.
(74) *Attorney, Agent, or Firm*—Fish & Richardson P.C.

(57) ABSTRACT

Seat cushions are provided including a foam bun, including a first, generally planar central region and a second, generally non-planar region, the first and second regions being separated by an elongated trench, and, disposed in the trench, an elongated touch fastener strip having a first surface that is bonded to the bottom of the trench and a second surface that carries a plurality of fastener elements. The trench has at least a portion of its bottom surface that is inclined with respect to a plane that is generally parallel to the planar central region, allowing the touch fastener strip to be extended around a curve in the trench without buckling.

26 Claims, 6 Drawing Sheets

ATTACHING COVERS TO SEAT CUSHIONS

TECHNICAL FIELD

The present invention is directed to methods of attaching seat covers during the manufacture of automotive seats, and to seat cushions manufactured by such methods.

BACKGROUND

In recent years seats for cars and light trucks have been formed by molding a foam bun that will serve as the seat cushion, and then attaching a pre-stitched fabric cover to the foam bun. Often, the fabric cover is attached to the foam bun by insert molding touch fastener strips into the outer surface of the foam bun and attaching cooperating touch fastener strips to an inner surface of the fabric cover. Generally, the fastener strips are attached to the fabric cover along the seams where the cover is stitched together, and held in place by the seam stitching. The touch fastener strips allow the seat manufacturer to rapidly and semi-permanently attach the fabric cover to the foam bun by pulling the fabric cover over the foam bun and pressing the opposed touch fastener strips on the foam bun and fabric cover together.

The touch fastener strips on the foam bun are typically recessed in trenches, to allow the seams in the fabric cover to be indented below the surface of the seat cushion. Indenting the seams in this manner forms aesthetically appealing indented creases in the surface of the seat cushion upholstery for a tailored look. The trenches also accommodate the additional thickness of upholstery fabric that is created where the seam is stitched.

For example, a foam bun 10, shown in FIG. 1, includes a central, generally planar portion 12 and a pair of bolsters 14, 16 disposed on either side of the central portion 12. The central portion 12 and bolsters 14, 16 are separated by trenches 18 which define sweeping curves. Trenches 18 are located in the seat cushion at the point of change in curvature formed where the surface of bolsters 14, 16 on the side of seat cushion 10 intersect central portion 12.

As shown in FIG. 2, touch fastener strips 24 are bonded to the bottom surface 17 of trenches 18, e.g., by insert molding the foam bun 10 onto the touch fastener strips 24 with hook elements 25 exposed for engagement with cooperative fastener strips 27 that are sewn to the fabric cover 29 along seams 31. Because the trenches 18 are indented below the surface 33 of the central portion 12, when the cooperative touch fastener strips 27 are pressed against the touch fastener strips 24 the double thickness of fabric 35 that is below seam 31 will be recessed in the trenches, resulting in a smooth outer surface at the seam area of the seat cover.

This attachment method works well for fabric covers having straight seams. However, if the fabric cover has seams that define sweeping curves, e.g., seams that have a curvature similar to that of trenches 18 in FIG. 1, problems occur because as the touch fastener strip extends around the curve in the trench the strip will tend to buckle. Seat designs having curved seams have become increasingly popular in the automotive industry, and thus attempts have been made to address this problem. Some manufacturers have cut and pieced together short sections of straight touch fastener strips. Other manufacturers have cut out curved sections from wider strips of touch fastener material. Both methods may result in an inefficient, time consuming process, waste material, and undesirably high production costs.

Alternately, touch fastener strips have been custom molded to accommodate the shape of a curved trench. This alternate solution results in custom-molded touch fastener strips that can only be used for trenches with a particular degree of curvature, increasing the cost of production and requiring the seat manufacturer to inventory a variety of different custom-molded touch fastener strips for trenches having different degrees of curvature.

SUMMARY

In one aspect, the invention features methods of attaching a fabric cover to a foam bun that allow a continuous length of a relatively straight touch fastener strip to be used in a trench that defines a sweeping curve.

The inventor has found that, by configuring the trench so that its bottom surface is inclined, a long, straight touch fastener strip can be positioned to extend around a sweeping curve in the trench without buckling of the strip. This eliminates that need to cut and piece fastener strip sections together to form sweeping curves (e.g., curves having a radius of curvature of greater than about 15 inches), and allows the seat manufacturer to stock a single type of touch fastener strip for use in manufacturing seat cushions with seams that have varying degrees of sweeping curves. In some cases, more dramatic curves can be obtained with limited cutting and piecing (e.g., with two fastener strips) or with a single fastener strip.

Narrower trenches are typically desirable, as they may enhance the aesthetic appearance of the finished seat. Generally, the width of the trench is dictated by the width of the fastener strip. However, by using an inclined trench, a narrow trench may be obtained without changing the width of the fastener strip. The depth of the trench may be increased vary to further contribute to the aesthetically desirable appearance of the seam in the finished seat. Advantageously, this improved aesthetic appearance can be obtained using the same tooling and manufacturing procedures that many seat manufacturers are currently using (the only change being the configuration of the trenches).

In one aspect, the invention features a seat cushion including a foam bun which includes a central region bounded on opposite sides by elongated trenches. Disposed in each trench is an elongated touch fastener strip having an exposed surface which contains a plurality of fastener elements. At least a portion of one of the elongated trenches has a bottom surface that is inclined with respect to the central region.

In some embodiments, at least a portion of the bottom surface of the trench is inclined so that in a cross-section taken generally perpendicular to the trenches, the bottom surface of at least a portion of the trench defines an included angle with respect to a plane which is generally perpendicular to the centerline of the seat. In some cases the included angle is from about 10 to 80 degrees. In other cases the included angle is from about 30 to 60 degrees.

In some embodiments, the elongated trenches include opposing side walls and the bottom surface is positioned between these side walls.

In certain embodiments, at least a portion of the bottom surface of one of the trenches is inclined at an angle selected to allow the fastener strip to extend around a sweeping curve having a radius of curvature of at least about 15 inches. In other embodiments at least a portion of one of the trenches defines a sweeping curve having a radius of curvature greater than about 15 inches.

In some embodiments, the seat cushion has a fabric cover, wherein the inner surface of the cover carries a second elongated touch fastener strip which is positioned to engage the touch fastener strip on the foam bun. In some cases the fastener elements on the seat cushion include male fastener elements, and the second touch fastener strip on the cover includes a loop material.

In some embodiments the seat cushion also has a pair of bolster regions, where the elongated trenches are disposed between the central region and the bolster regions. The central region may be configured to support the back of a person sitting in the seat cushion, or may be configured to define the bottom of the seat.

According to another aspect, the invention features a method of forming a seat cushion including a foam bun. The method includes providing a mold cavity which has a shape corresponding to the shape of the foam bun, including a central portion bounded by elongated mold valleys. At least a portion of the bottom surface of one of the mold valleys is inclined with respect to the central region. The method also includes placing a touch fastener strip into each of the mold valleys, and delivering foam to the mold cavity.

In some embodiments of this method, at least a portion of the bottom surface of one of the elongated mold valleys is inclined so that in a cross-section taken generally perpendicular to the mold valley, the bottom surface of at least a portion of the mold valley defines an included angle with respect to a plane which is generally perpendicular to the centerline of the seat. In some cases the included angle is from about 10 to 80 degrees. In other cases the included angle is from about 30 to 60 degrees. At least a portion of the bottom surface of one of the mold valleys may be inclined at an angle selected to allow the touch fastener strip to extend around a sweeping curve having a radius of curvature of at least about 15 inches.

According to another aspect, the invention features a mold for forming a foam bun includes a mold cavity having a shape corresponding to the shape of the foam bun, including a central region and a pair of bolder-defining regions. Between the central region and the bolster-defining regions are a pair of elongated mold valleys, wherein the bottom surface of at least a portion of one of the mold valleys is inclined at an angle with respect to the central region.

In some embodiments, the mold has elongated mold valleys which are inclined so that in a cross-section taken generally perpendicular to the mold valleys, at least a portion of one of the bottom surfaces of the mold valleys defines an included angle with respect to a plane which is perpendicular to the centerline of the seat. In some cases the included angle is from about 10 to 80 degrees. In other cases the included angle is from about 30 to 60 degrees.

In certain embodiments, at least a portion of one of the bottom surfaces of the mold valleys is inclined at an angle selected to allow the fastener strip to extend around a sweeping curve having a radius of curvature of at least about 15 inches.

In some embodiments the mold has a central region which defines a central back-supporting or seat bottom area of the foam bun, and a bolster-defining region which defines bolster areas of the foam bun.

According to another aspect, the invention features a seat cushion including a foam bun which includes a first, generally planar region, and a second, generally non-planar region, wherein the second region has an inclined surface. An elongated touch fastener strip has a first surface which is bonded to the inclined surface, and a second surface which carries a plurality of fastener elements.

In some embodiments, the foam bun of this seat cushion has a trench which extends between the first and second regions.

According to a further aspect, the invention features a seat cushion including a foam bun which includes a first, generally planar central region and a second, generally non-planar region, these first and second regions being separated by an elongated trench, the trench having a bottom surface wherein at least a portion of the bottom surface is inclined to form an included angle with respect to a plane that is perpendicular to the centerline of the seat. The included angle is from about 10 to 80 degrees. Disposed in this trench is an elongated touch fastener strip having a first surface that is bonded to the bottom of the trench and a second surface that carries a plurality of fastener elements. Covering an outer surface of the foam bun is a fabric cover. The fabric cover has an inner surface carrying a second elongated touch fastener strip that is positioned to engage the touch fastener strip on the foam bun.

Other features and advantages of the invention will be apparent from the description and drawings, and from the claims.

DETAILED DESCRIPTION

As discussed above, FIG. 1 shows a foam bun 10 with trenches 18 in which a fastener strip 24 is positioned for attachment of a fabric cover. As discussed above and shown in FIG. 2, it is well known to position the attachment strip in a flat-bottomed trench.

Figure 2:
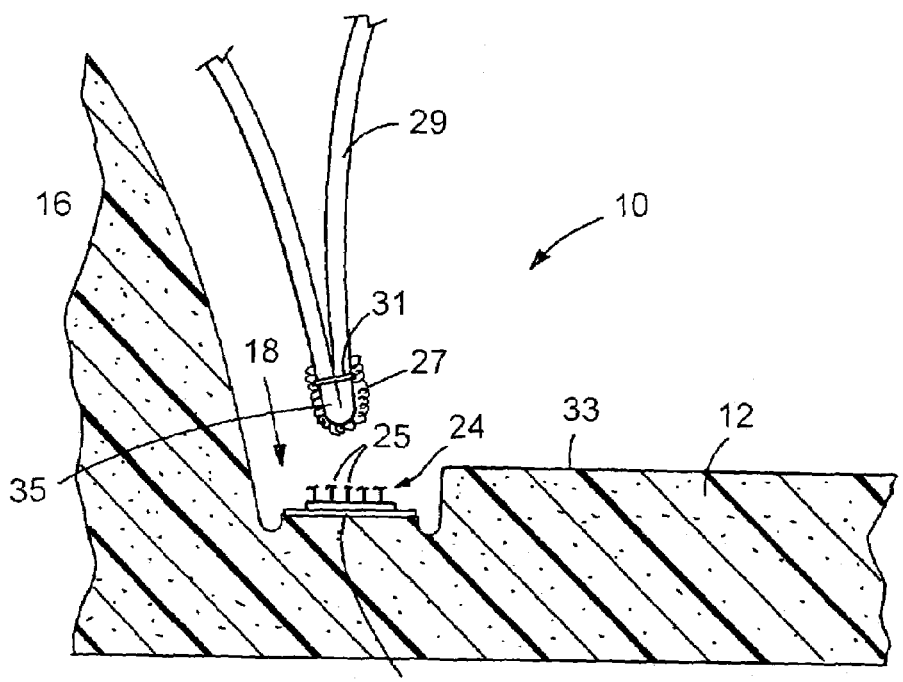
FIG. 2 is a highly enlarged cross-sectional view of a portion of the foam bun, taken along line A—A in FIG. 1, showing a prior art fastening system.
Figure 3:
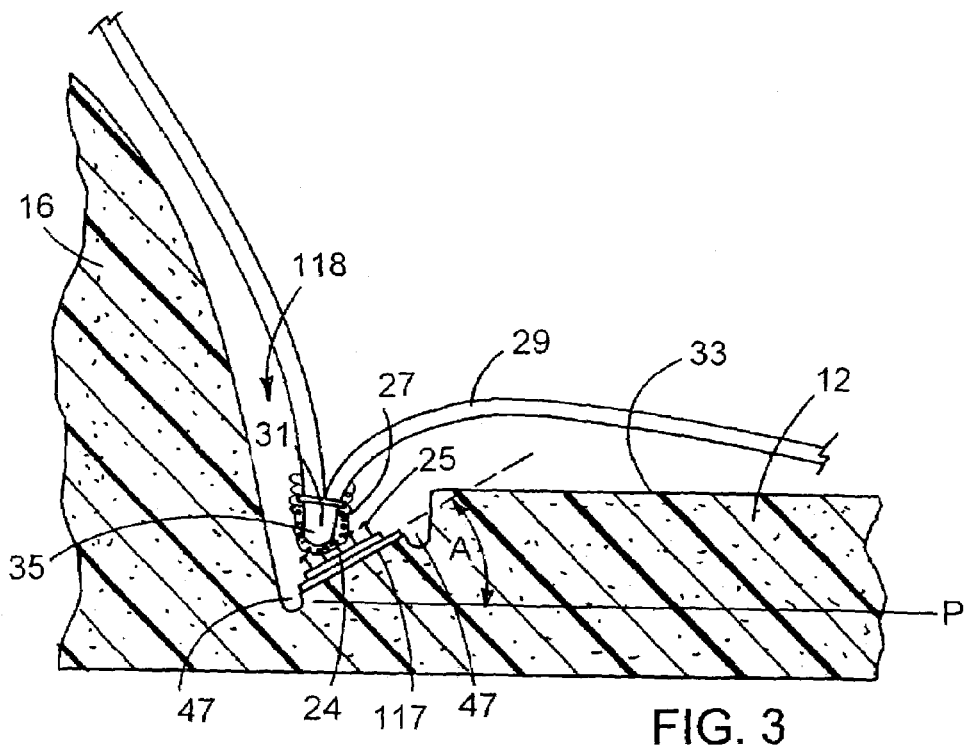
FIG. 3 is a highly enlarged cross-sectional view of the same area of the bun, also taken along line A—A in FIG. 1, in which the prior art fastening system is replaced by a fastening system according to one embodiment of the invention.
Figure 3A:
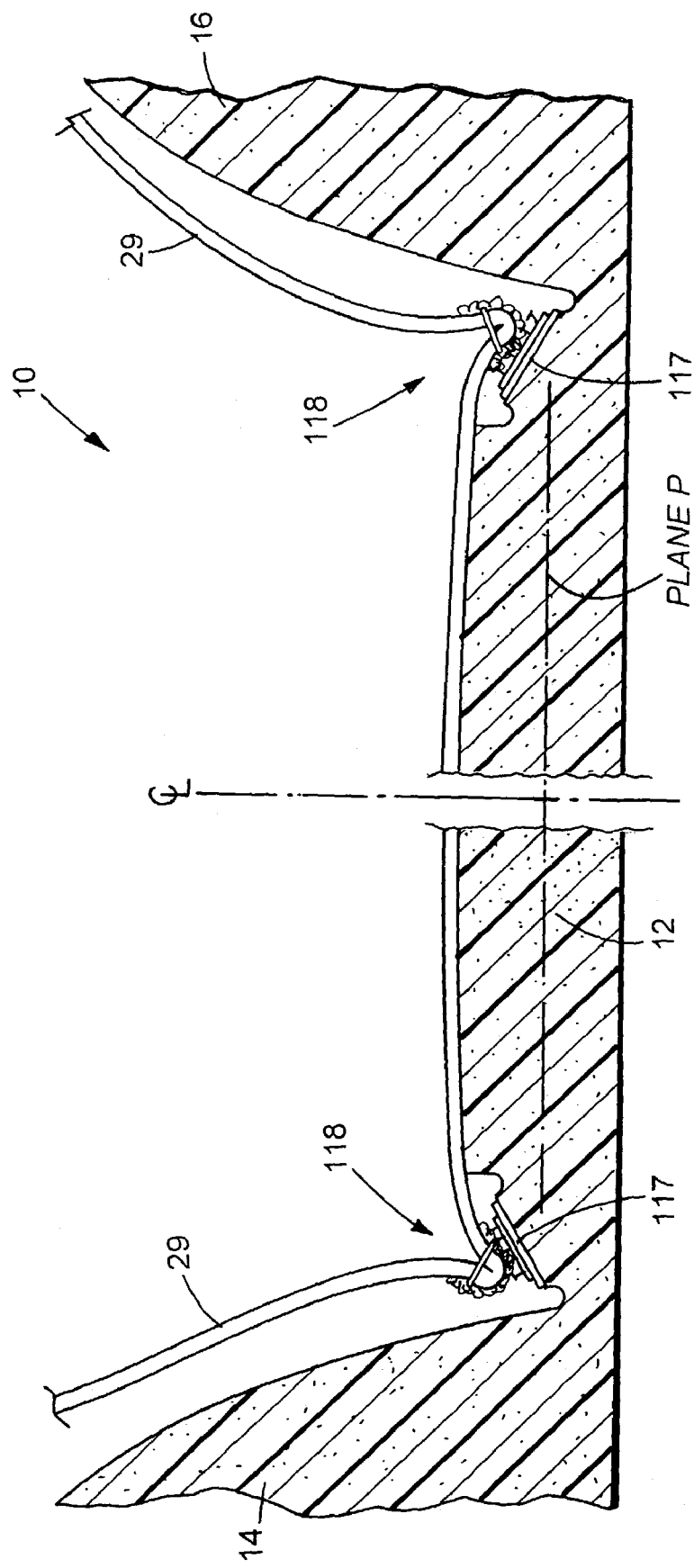
FIG. 3A is a cross-sectional view of the entire bun, taken along line 3A—3A in FIG. 1.

In the embodiment shown in FIGS. 3 and 3A, the flat-bottomed trenches 18, shown in FIG. 2, are replaced by trenches 118 having an inclined bottom surface 117. Inclined bottom surface 117 is disposed at an angle A relative to a plane P that is generally parallel to the planar surface of central portion 12 and perpendicular to the centerline CL of the seat. Typically, angle A is from about 10 to 80 degrees, preferably about 30 to 60 degrees. A suitable angle for a given application can be selected based on the degree of curvature of the trench and the narrowness of the trench desired.

Generally, as angle A increases, the trench may define curves with decreasing radii of curvature which results in increasing deformation of the ends of the fastener strip either up or down. However, as the radius of curvature decreases, the free ends of the strip will tend to bend downward and the center of the strip will tend to rise (or vice versa, depending on the configuration of the slope), preventing the entire length of the strip from seating properly in the trench. Thus, it is generally preferable that the radius of curvature of the trench be greater than about 15 inches. Lesser radii of curvature may be used, however it may be necessary to piece together two or more sections of fastener strip to accommodate such curves.

As shown in FIGS. 3 and 3A, the incline of the slope of the bottom surface 117 of the trench 118 can be defined by the angle A where such angle is measured from a plane P which is perpendicular to the centerline CL of the seat, where plane P is generally parallel to the in-car position of the occupant and which is generally flat to the central portion 12 of the seat.

Figure 5:
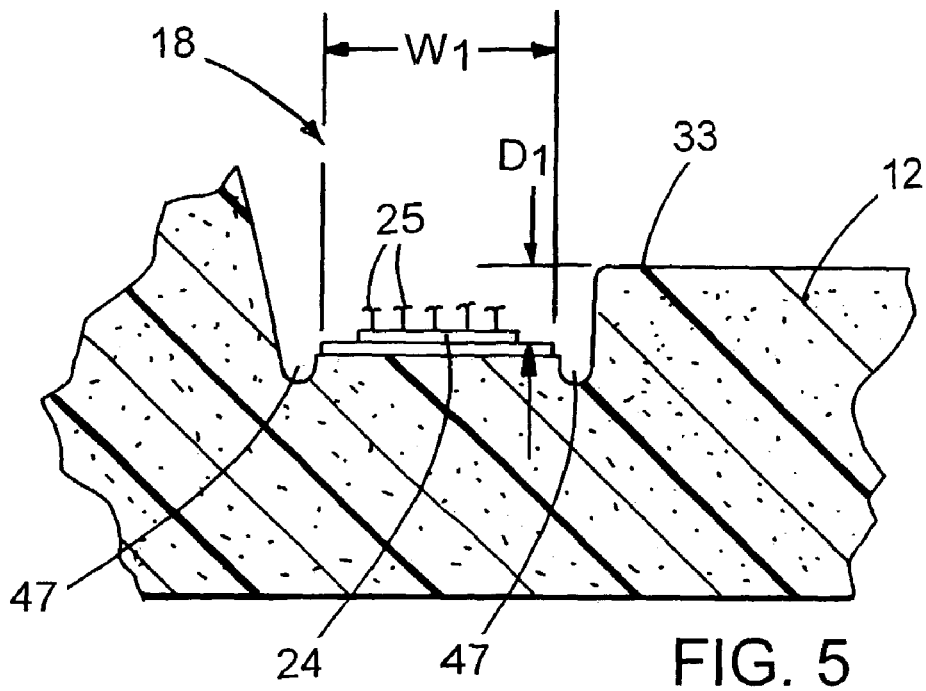
FIG. 5 is an enlarged detail view of the portion of the seat cushion shown in FIG. 2.
Figure 6:
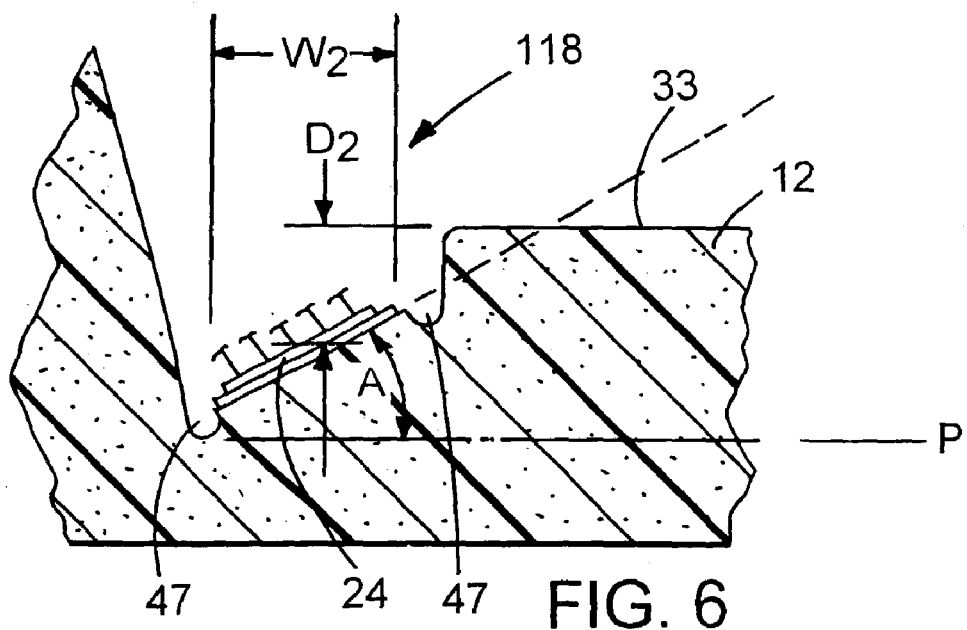
FIG. 6 is an enlarged detail view of the portion of the seat cushion shown in FIG. 3.

The relative dimensions of the flat-bottomed and inclined trenches are shown in FIGS. 5 and 6. As shown in FIG. 5, typically a prior art flat-bottomed trench will have a width W1 of from about 0.75 to 1.25 inches, e.g., less than 1.0 inch, and a depth D1 of from about 0.0 inches to 2.0 inches. Widths W1 and W2 are defined as the horizontal distance between opposing side edges of the fastening strip. Optional trenches 47 are shown disposed on either side of fastening strip 24. Depths D1 and D2 will vary based on the style of the seat, and are defined as the vertical distance between the surface 33 of central portion 12 and the centerline of the fastening strip 24.

As discussed above, due to the slope of the bottom surface of the trench, the width W2 of the trench is generally less than W1, e.g., at least 10% less. Thus, W2 is preferably less than 1 inches, typically about ⅝ to ¾ inches. These widths correspond to a fastener strip having an overall width of generally less than about 1 inch, typically from about ⅝ to ¾ inches, with a hook-carrying width of from about ½ to ⅝ inches.

A suitable process for insert molding a foam bun onto a fastener strip is described in U.S. Pat. No. 5,945,193 to Pollard, entitled TOUCH FASTENER WITH POROUS METAL CONTAINING LAYER, the entire disclosure of which is incorporated herein by reference.

Figure 4:
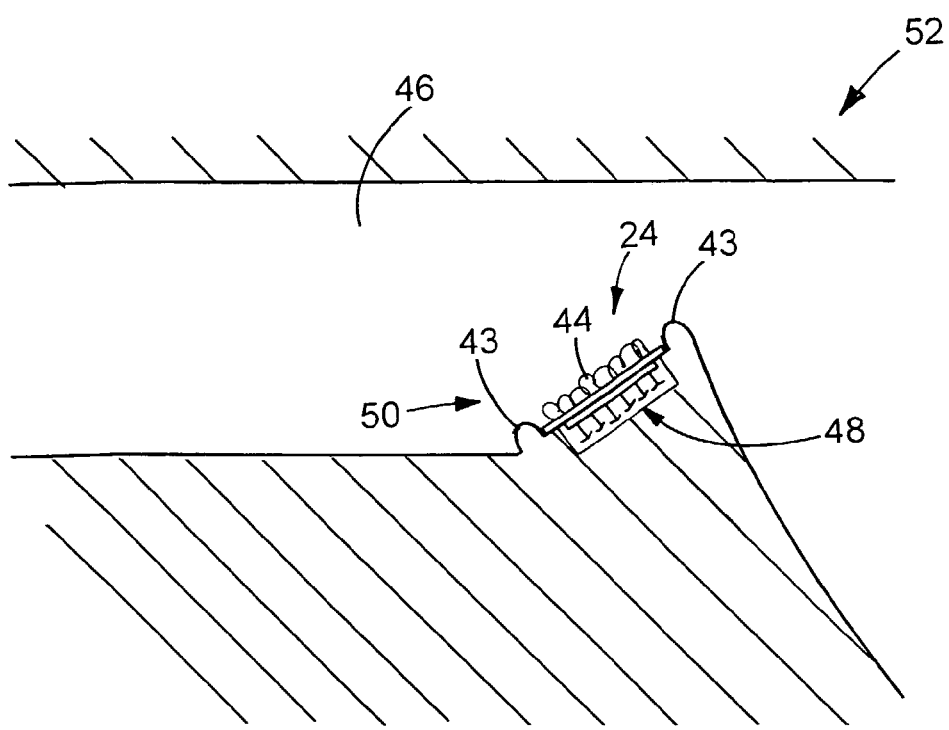
FIG. 4 is an enlarged cross-sectional view showing a mold for the foam bun of FIG. 1.

To form the molded bun 10, touch fastener strip 24 is placed in mold 52, as shown in FIG. 4. The touch fastener strip 24 contains a magnetically-attractable component (not shown), e.g. a metal shim bonded between one or more layers of the fastener strip, or a ferrous metal filler incorporated in the fastener strip. The magnetically attractable component holds the touch fastener strip 24 securely in the mold, due to magnetic attraction to a magnet (not shown) in the mold. The touch fastener strip also includes loops 44, on the non-hook-carrying side 50 of the strip.

Figure 4A:
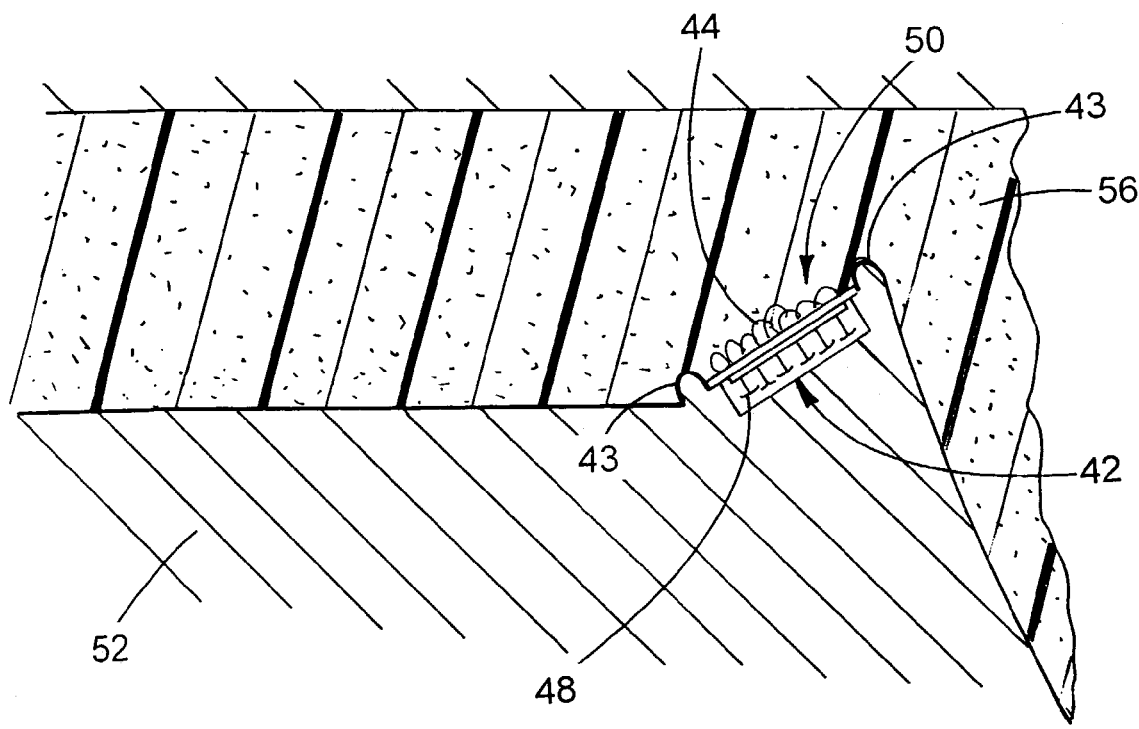
FIG. 4A is similar to FIG. 4, but shows the mold after foam has been delivered to the mold cavity.

As shown in FIGS. 4 and 4A, the hook-carrying side 48 of touch fastener strip 24 is placed in a fastener element-receiving mold valley 42 of mold 52, with the non-hook-carrying side 50 of touch fastener strip 24 facing into the mold cavity 46. Referring to FIG. 4A, foam 56, e.g. a molten polyurethane, is delivered to the mold cavity 46, where the foam 56 comes into contact with side 50 of the touch fastener strip 24. The foam 56 bonds to side 50, embedding loops 44 in foam, thereby bonding touch fastener strip 24 to the foam bun.

As is known in the art, several features may be provided to protect the hooks from being contaminated with foam. To prevent foam 56 from entering mold valley 42, mold valley 42 is generally narrower than the width of the touch fastener strip 24, so that the edges of touch fastener strip 24 extend beyond the sides of the mold valley 42. Also, mold valley 42 may include ridges 43, corresponding to channels 47 in FIGS. 3 and 6, to inhibit flow of foam around the edges of the fastener strip 24. Additionally, as described in U.S. Pat. No. 4,693,921, the complete disclosure of which is incorporated herein by reference, a removable protective barrier (not shown) may be placed over the hooks of hook-carrying side 48 of touch fastener strip 24, prior to placing touch fastener strip 24 into mold 52.

Suitable fastener strips are described, e.g., in U.S. Pat. Nos. 5,996,189, 6,066,281 and 6,129,970, the complete disclosures of which are incorporated herein by reference. U.S. Pat. No. 5,996,189 to Wang, entitled WOVEN FASTENER PRODUCT, describes touch fastener products formed by weaving methods. U.S. Pat. No. 6,066,281 to Provost, entitled FASTENER PRODUCTS AND THEIR PRODUCTION, describes touch fastener products formed by extruding molten polymer through an extrusion die. U.S. Pat. No. 6,129,970 to Kenney et al., entitled TOUCH FASTENER WITH MAGNETIC ATTRACTANT AND MOLDED ARTICLE CONTAINING SAME, describes incorporation of a magnetic attractant to touch fastener products. Touch fastener elements may also be formed by molding the stems and post-forming the end of the stems to form the fastener heads. Extruded touch fastener products may also be formed by extruding with fastening element rails, then cutting and stretching the element rails.

Other embodiments are within the scope of the following claims.

Figure 7:
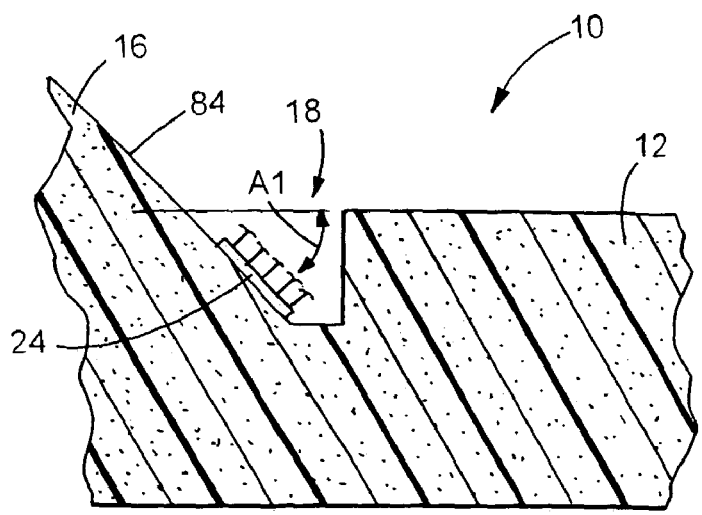
FIG. 7 is an enlarged cross-sectional view showing an alternate embodiment of the invention.
Figure 7A:
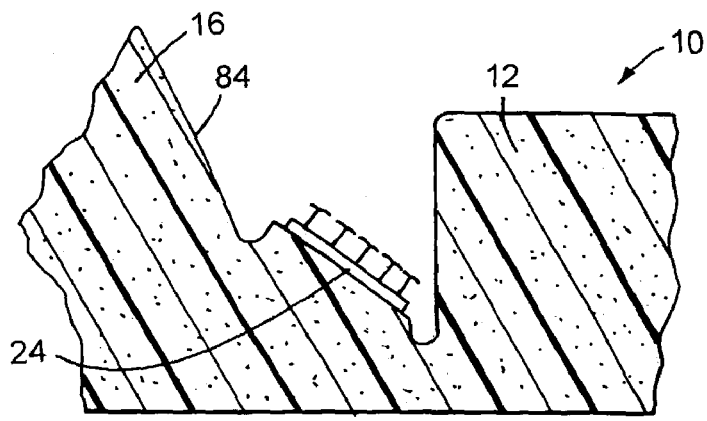
FIG. 7A is an enlarged cross-sectional view showing an alternate embodiment of the invention.
Figure 8:
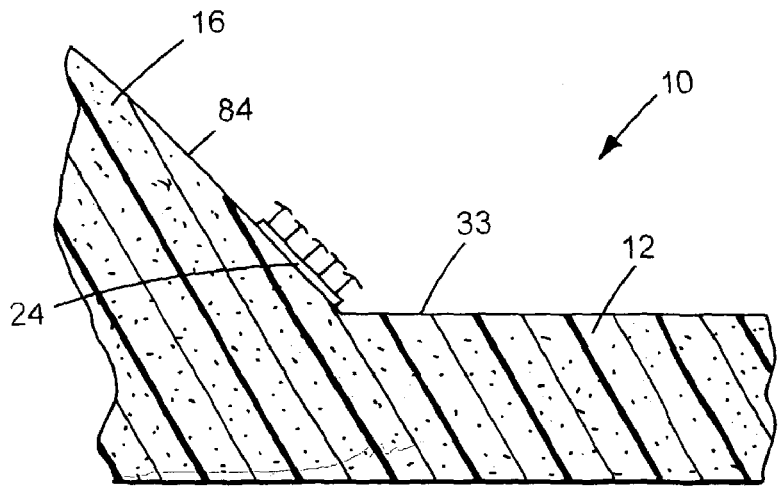
FIG. 8 is an enlarged cross-sectional view showing an alternate embodiment of the invention.

For example, the touch fastener strip may be positioned on an inclined surface other than the bottom surface of the trench. Thus, as shown in FIG. 7, touch fastener strip 24 may be placed on inclined surface 84 of bolster 16. In this embodiment, the bottom surface of trench 18 may be flat (as shown) or inclined (as in FIG. 7A). The inclined surface is disposed at an angle A1 with respect to the generally planar surface of the central portion 12 and perpendicular to centerline CL that is preferably approximately the same as angle A discussed above. Similarly, as shown in FIG. 8, touch fastener strip 24 may be located on inclined surface 84 of side bolster 16 and the trench between bolster 16 and central portion 12 of seat cushion 10 can be omitted entirely. In this embodiment touch fastener strip 24 is not located below the surface 33 of central portion 12 of seat cushion 10.

Moreover, while in the embodiments shown in FIGS. 2–8 a hook-carrying touch fastener strip is shown on the foam bun, and a cooperative loop-carrying touch fastener strip is shown on the fabric cover, alternatively the loop touch fastener may be positioned on the foam bun and the hook touch fastener may be attached to the upholstery.

Also, while hooks have been discussed above, other types of fastener elements may be used, e.g., mushroom heads or other male fastener. Male-to-male cooperative touch fastener elements may also be used. Preferably, the hooks are multi-directional, as shown. If the hooks include crooks that face in one direction only, it is generally preferred that the crooks face the bottom of the trench. However, the hooks can face in any desired direction provided that adequate engagement strength is obtained.

Moreover, while the touch fastener strip has been illustrated as spanning substantially the entire width of the trench, the touch fastener strip may be narrower than the trench.

The entire length of the bottom surface of the trench may be inclined, as described above, or, if desired, the trench may be relatively flat-bottomed in areas that are not curved, and the bottom surface inclined only in areas that are curved. The bottom surface of the trench or portions thereof may also be inclined in trenches that are not curved.

Figure 1:
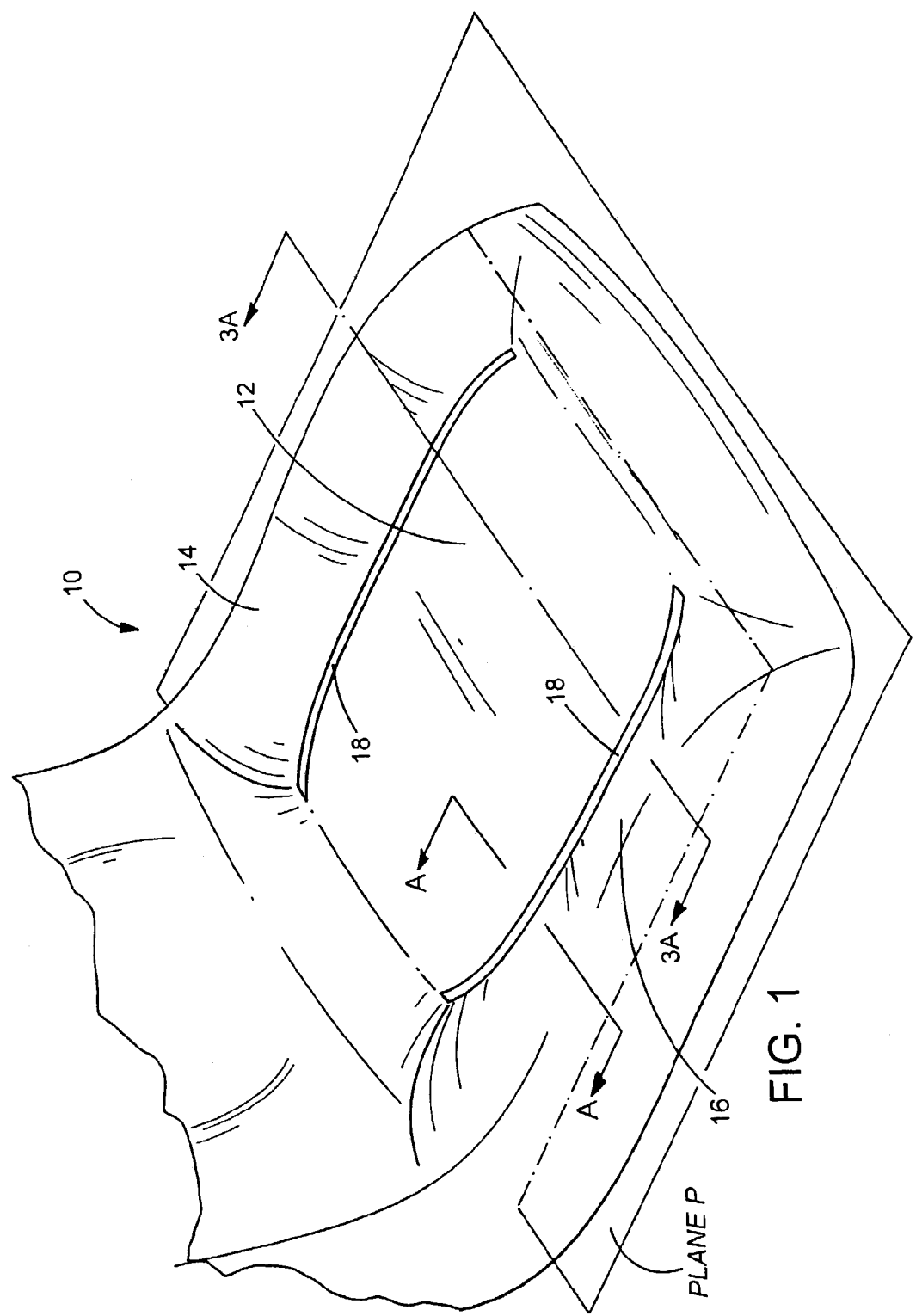
FIG. 1 is a schematic perspective view of a portion of a foam bun.

An example of a seat cushion design is shown in FIG. 1. However, it will be appreciated that the invention may be used in many other types of seat cushion designs, with trenches disposed in other areas and having other degrees of curvature.

Moreover, while the trenches shown in the figures and discussed above include a bottom and generally parallel side walls, the side wall between the trench bottom and the central portion may be omitted, in which case the inclined surface on which the fastener strip is disposed would be considered the bottom surface of the trench.

What is claimed is:

1. A seat cushion comprising:
   a foam bun, including a central region bounded on two opposite sides by elongated trenches; and
   disposed in each trench, an elongated touch fastener strip having an exposed surface that carries a plurality of fastener elements;
   wherein at least a portion of one of the elongated trenches has a bottom surface that is inclined with respect to the central region, and wherein substantially the entire width of the touch fastener strip is disposed on the inclined bottom surface; and
   wherein at least a portion of one of the bottom surfaces of the trenches is inclined at an angle selected to allow the fastener strip to extend around a sweeping curve having a radius of curvature of at least about 15 inches.

2. The seat cushion of claim 1 wherein at least a portion of one of the bottom surfaces of the elongated trenches is inclined so that in a cross-section taken generally perpendicular to the trenches the bottom surface of the inclined portion of the trench defines an included angle with respect to a plane which is perpendicular to the centerline of the seat cushion.

3. The seat cushion of claim 2 wherein said included angle is from about 10 to 80 degrees.

4. The seat cushion of claim 3 wherein said included angle is from about 30 to 60 degrees.

5. The seat cushion of claim 1 wherein the fastener strip is less than 1 inch wide.

6. The seat cushion of claim 1 wherein the trench is less than 1 inch wide.

7. The seat cushion of claim 1 wherein each of said elongated trenches includes opposing side walls and said bottom surface is positioned between said side walls.

8. The seat cushion of claim 1 wherein the fastener elements comprise male fastener elements.

9. The seat cushion of claim 1 further comprising a pair of bolster regions, the elongated trenches being disposed between the central region and the bolster regions.

10. The seat cushion of claim 9 wherein the central region is configured to support a back of a person sitting on the seat cushion.

11. The seat cushion of claim 9 wherein the central region is configured to define a seat bottom.

12. The seat cushion of claim 1, wherein the seat cushion further comprises a fabric cover, having an inner surface carrying a second elongated touch fastener strip that is positioned to engage the touch fastener strip on the foam bun.

13. The seat cushion of claim 12 wherein the fastener elements comprise male fastener elements, and the second touch fastener strip comprises a loop material.

14. A seat cushion comprising:
    a foam bun, including a central region bounded on two opposite sides by elongated trenches; and
    disposed in each trench, an elongated touch fastener strip having an exposed surface that carries a plurality of fastener elements;
    wherein at least a portion of one of the elongated trenches has a bottom surface that is inclined with respect to the central region, and wherein substantially the entire width of the touch fastener strip is disposed on the inclined bottom surface; and
    wherein at least a portion of one of the trenches defines a sweeping curve having a radius of curvature greater than about 15 inches.

15. The seat cushion of claim 14 wherein at least a portion of one of the bottom surfaces of the elongated trenches is inclined so that is a cross-section taken generally perpendicular to the trenches the bottom surface of the inclined portion of the trench defines an included angle with respect to a plane which is perpendicular to the centerline of the seat cushion.

16. The seat cushion of claim 15 wherein said included angle is from about 10 to 80 degrees.

17. The seat cushion of claim 16 wherein said included angle is from about 30 to 60 degrees.

18. The seat cushion of claim 14 wherein the fastener strip is less than 1 inch wide.

19. The seat cushion of claim 14 wherein the trench is less than 1 inch wide.

20. The seat cushion of claim 14, wherein the seat cushion further comprises a fabric cover, having an inner surface carrying a second elongated touch fastener strip that is positioned to engage the touch fastener strip on the foam bun.

21. The seat cushion of claim 20 wherein the fastener elements comprise male fastener elements, and the second touch fastener strip comprises a loop material.

22. The seat cushion of claim 14 further comprising a pair of bolster regions, the elongated trenches being disposed between the central region and the bolster regions.

23. The seat cushion of claim 22 wherein the central region is configured to support a back of a person sitting on the seat cushion.

24. The seat cushion of claim 22 wherein the central region is configured to define a seat bottom.

25. The seat cushion of claim 14 wherein each of said elongated trenches includes opposing side walls and said bottom surface is positioned between said side walls.

26. The seat cushion of claim 14 wherein the fastener elements comprise male fastener elements.

* * * * *

UNITED STATES PATENT AND TRADEMARK OFFICE
CERTIFICATE OF CORRECTION

PATENT NO. : 7,077,473 B2
APPLICATION NO. : 10/406413
DATED : July 18, 2006
INVENTOR(S) : John DeMain and Peter Leach It is certified that error appears in the above-identified patent and that said Letters Patent is hereby corrected as shown below:

Title Page, (56) References Cited, OTHER PUBLICATIONS, "PT" should be --PCT--

Column 8, Claim 15, line 25, "is" should be -- in --.

Signed and Sealed this

Sixth Day of November, 2007

JON W. DUDAS
*Director of the United States Patent and Trademark Office*